United States Patent
McCoy

[15] 3,698,777
[45] Oct. 17, 1972

[54] TAPERED ROLLER BEARING WITH MINIMUM HEAT GENERATING CHARACTERISTICS

[72] Inventor: Wyn Eugene McCoy, Canton, Ohio
[73] Assignee: The Timken Company, Canton, Ohio
[22] Filed: Dec. 8, 1970
[21] Appl. No.: 96,189

[52] U.S. Cl. ................................................308/187
[51] Int. Cl. .........................F16c 33/66, F16c 33/00
[58] Field of Search......308/187, 212, 213, 214, 207, 308/208, 209

[56] References Cited

UNITED STATES PATENTS

| | | | |
|---|---|---|---|
| 593,188 | 10/1897 | Barker | 388/187 |
| 1,884,395 | 10/1932 | Tyson | 308/214 |
| 2,071,628 | 2/1937 | Hedcock | 308/214 |

Primary Examiner—Edgar W. Geoghegan
Assistant Examiner—Frank Susko
Attorney—Gravely, Lieder & Woodruff

[57] ABSTRACT

A tapered roller bearing has shallow circumferentially extending grooves in the tapered raceways of its cup and cone. Those grooves prevent full line contact between the frustoconical side surfaces of the tapered rollers and the tapered raceways and this in turn reduces the elastohydrodynamic oil film. The reduction of the elastohydrodynamic oil film minimizes the generation of heat within the bearing. The cup is further provided with annular channels through which oil is circulated to dissipate heat from the bearing.

10 Claims, 3 Drawing Figures

PATENTED OCT 17 1972

3,698,777

INVENTOR

WYN E. McCOY

BY Gravely, Lieder & Woodruff

ATTORNEYS 3,698,777

TAPERED ROLLER BEARING WITH MINIMUM HEAT GENERATING CHARACTERISTICS

BACKGROUND OF THE INVENTION

This invention relates in general to bearings and more particularly to a tapered roller bearing which generates a minimum amount of heat in operation.

In the operation of a precision machine tool the temperature differential between various components and parts of the tool is an important consideration, for any changes in temperature effect a dimensional change in the tool itself, and this produces errors in tooling set-ups. One of the major sources of heat in a machine tool is the bearings, and in the case of tapered roller bearings, the heat is attributable primarily to the formation of an elastohydrodynamic oil film at the full line contact between the frustoconical surfaces of the tapered rollers and the opposed tapered raceways of the cup and cone along which the rollers roll.

The problem is particularly acute in relation to those bearings which form the journals for critical machine tool parts such as the spindle which drives the cutting tool or workpiece, for the heat generated in these bearings is concentrated in the areas of the machine where expansion and contraction will cause the greatest errors in tooling set-ups. Consequently, the temperature of machine tool spindle bearings and the like must be maintained substantially constant. Moreover, it is desirable to reduce the generation of heat to an absolute minimum and to quickly dissipate that heat which is generated in order to have the machine tool operate close to room temperature. Of course, when the machine tool operates at room temperature, tooling set-ups may also be made at that temperature.

While machine tools are perhaps most adversely affected by the generation of heat in rolling element bearings, the problem also presents itself in other machinery such as printing presses and coating machines.

SUMMARY OF THE INVENTION

One of the principal objects of the present invention is to provide a tapered roller bearing which reduces the elastohydrodynamic film between the rollers and raceways to a minimum so that the bearing generates a minimum amount of heat. Another object is to provide a bearing from which heat is dissipated rapidly. A further object is to provide a bearing having an optimum amount of internal stiffness. Still another object is to provide a bearing which is ideally suited for use in precision machine tools and particularly for the spindles in such machine tools. These and other objects and advantages will become apparent hereinafter.

The present invention is embodied in a tapered roller bearing having a cup and cone provided with opposed raceways along which tapered rollers roll. At least one of the raceways is relieved to form a depression so that full line contact between the roller side face and the raceway is avoided. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
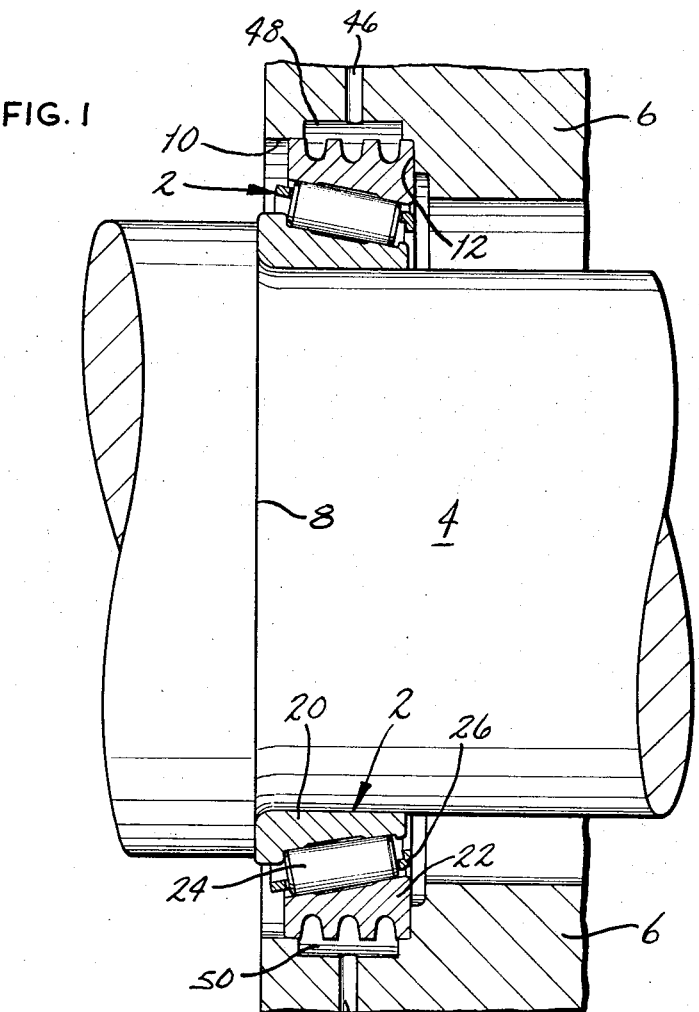
FIG. 1 is a sectional view of a bearing constructed in accordance with and embodying the present invention.

Referring now to the drawings (FIG. 1), 2 designates a tapered roller bearing which supports a shaft 4 in a housing 6. In actual practice, usually two bearings 2 are employed and these bearings are mounted in opposition so that one can be adjusted against the other to eliminate axial and radial play in both bearings 2. The opposed mounting of tapered roller bearings is a conventional practice and, therefore, will not be illustrated or discussed further, other than to note that it enables the shaft 4 to carry axial loads in both directions as well as radial loads.

In order to mount the tapered roller bearing 2 in opposition with another tapered roller bearing 2, the shaft 4 is provided with a shoulder 8 against which one end of the bearing 2 abuts, while the housing 6 is provided with a cylindrical recess 10 terminating at a shoulder 12 against which the other end of the bearing 2 abuts. The bearing 2 fits, or more specifically, is seated, within the recess 10.

The housing 6 may be the headstock of a precision lathe, grinder, or other machine tool, while the shaft 4 may be the spindle of such a lathe or machine tool. As previously noted, in machine tools of this nature, the temperature of the headstock and spindle is an important consideration, and that temperature must not fluctuate appreciably while the machine tool operates, for if it does the machine tool will experience dimensional changes will create errors in tooling set-ups. Moreover, the temperature of the headstock and spindle should remain close to room temperature during operation of the machine tool so that tooling set-ups and workpiece changes may be made while the machine is at room temperature. In order to accomplish the foregoing the spindle bearings in the headstock should produce a minimal amount of heat and any heat which is produced should be dissipated rapidly.

Figure 2:
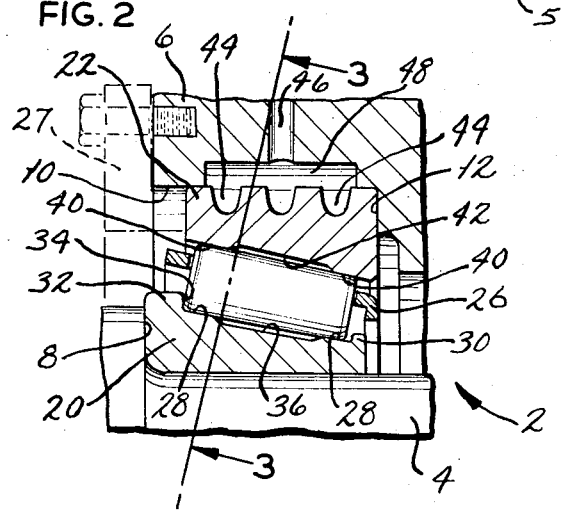
FIG. 2 is an enlarged fragmentary sectional view of the bearing.

The bearing 2 includes (FIG. 2) a cone 20, a cup 22 encircling the cone 20, a set of tapered rollers 24 interposed between the cone 20 and cup 22, and a cage 26 also disposed between the cone 20 and cup 22 and separating as well as retaining the rollers 24. The cone 20, of course, fits around the shaft 4 and against the shoulder 8 thereon, while the cup 22 is press fitted into the cylindrical recess 10 with its one end or back face abutting against the shoulder 12. The cone 20 of course constitutes the inner race of the bearing 2, while the cup 22 forms the outer race. The cup 22 may also be loose fitted into the recess 10, in which case an end plate 27 should be used to clamp it in place (FIG. 2, phantom lines).

Figure 3:
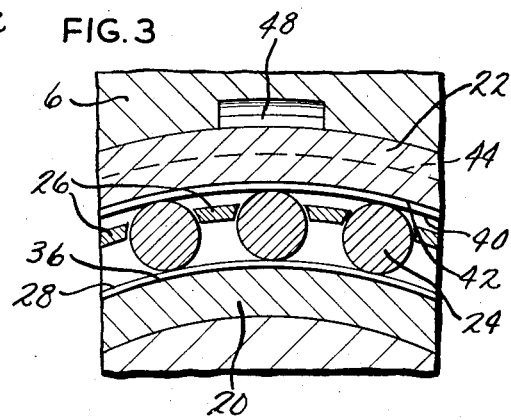
FIG. 3 is a fragmentary sectional view taken along line 3—3 of FIG. 2.

The cone 20 has (FIGS. 2 and 3) an outwardly presented tapered raceway 28 which is engaged by the frustoconical side faces of the rollers 24. At the small diameter end of the raceway 28 the cone 20 is provided with an integrally formed retaining rib 30 for preventing the rollers 24 from sliding axially off of the cone 20 when the cone 20 is removed from the cup 22. At the large diameter end of its tapered raceway 28 the cone 20 is further provided with an integrally formed thrust rib 32 having an inside face 34 against which the large diameter ends of the tapered rollers 24 bear as the rollers 24 roll along the raceway 28. The thrust rib 32 extends axially to the end or back face of the cone, and that face bears against the shoulder 8 on the shaft 4.

The tapered raceway 28 extends up to and terminates at each rib 30 and 32, but is not continuous between the ribs 30 and 32. On the contrary, the raceway 28 is relieved between its sides, or more specifically the cone 20 is provided with a shallow circumferential groove 36 which disposed between the sides of the raceway 28 so that the raceway 28 is divided into two segments, one of which is positioned adjacent to the retaining rib 30 and the other of which is positioned adjacent to the thrust rib 32. The two segments of the raceway 28 lie in the same reference cone, and that cone has its apex along the common axial centerline of the bearing 2 and the shaft 4.

As in conventional tapered roller bearings, the cage 26 has substantially rectilinear pockets which receive the rollers 24, but are smaller in width than the diameter of the received rollers 24 so that the rollers 24 will project beyond the cage 26 yet cannot be withdrawn outwardly from cone 20. Consequently, the cage 26 in conjunction with the ribs 30 and 32 retains the rollers 24 on the cone 20.

The cup 22 has (FIGS. 2 and 3) a tapered raceway 40 which is presented inwardly toward the cone raceway 28 and is likewise engaged by the frustoconical side faces of the rollers 24. Thus, the rollers 24 roll along both the raceways 28 and 40 as they revolve within the cup 22 and about the cone 20. Like the cone raceway 28, the cup raceway 40 is relieved or interrupted, that is to say it is divided into two segments by a shallow circumferential groove 42 which is disposed between the sides of the raceway 40 and is located generally opposite to the groove 36 in the cone raceway 28. Accordingly, the cup raceway 40 engages the frustoconical side faces of the rollers 24 near the ends thereof, but does not engage the side faces of the rollers along the central positions thereof. The two segments of the raceway 40 lie in the same reference cone, and that reference cone has its apex along the common centerline of the bearing 2 and shaft 4 at the point thereon where the apex of the reference cone defining the cone raceway 28 is located.

On its opposite side the cup 22 is provided with a plurality of axially spaced annular channels 44 which open radially outwardly. Since the cup 22 is snugly fitted into the cylindrical recess 10 of the housing 6, the open sides of the channels 44 are covered by the cylindrical side wall of the recess 10, thus forming closed coolant channels around the cup 22. When the cup 22 is press fitted into the recess 10 the snugness of the fit alone is enough to create an adequate seal for the channels 44. When a loose fit is employed the end plate 27 provides a suitable seal. The coolant channels 44 are supplied with a liquid coolant through a duct 46 (FIG. 1) in the housing 6 and a supply manifold 48 at the inner end of the duct 46. The supply manifold 48 is merely a relief which extends across all of the annular channels 44 so that the coolant can be distributed to those channels 44. The coolant which enters the supply manifold 48 enters the annular channels 44 and flows around the cup 22, and in so doing absorbs heat therefrom. The coolant leaves the annular channels 44 at a discharge manifold 50 located opposite to the supply manifold 48 and a return duct 52 leading away from the manifold 50.

As the shaft 4 rotates with respect to the housing 6, the cone 20, of course, rotates within the cup 22. The tapered rollers 24, in turn, being positioned between and engaged with the raceways 28 and 40 of the cone 20 and cup 22, respectively, roll along those raceways. Moreover, the large diameter end faces of the rollers 24 bear or slide against the inside face 34 of the thrust rib 32, and accordingly the thrust rib 32 positions the rollers 24 axially with respect to the cone 20. Since, the contact between the end faces of the rollers 24 and the inside face 34 of the thrust rib 32 is sliding in nature a thin film of lubricant must be maintained between those opposed faces to prevent failure and destruction of the bearing. Lubricant also is introduced to the raceways 28 and 40, and is worked along those raceways by the rollers 24.

The presence of the shallow grooves 36 and 42 in the raceways 28 and 42, respectively prevents full line contact between the frustoconical side surfaces of the rollers 24 and the cone 20 and cup 22. This, in turn, reduces the elastohydrodynamic oil film resulting from the presence of the lubricant on the raceways 28 and 40 to an absolute minimum. In other words, the elastohydrodynamic oil film is confined entirely to the relatively short lines of contact between the raceways 28 and 40 and the frustoconical side faces of the rollers 24. In this connection, it should be noted that the depth of the grooves 36 and 42 exceeds the thickness of the elastohydrodynamic oil film. The lines of contact do not extend the full length of the rollers 24 as is true in conventional tapered roller bearings, but on the contrary are only at the ends of the rollers.

Since the elastohydrodynamic oil film between the rollers 24 and the raceways 28 and 40 is greatly reduced, the heat generated in creating and maintaining it is also reduced in comparison to conventional tapered roller bearings. Consequently, the bearing 2 produces relatively little heat in operation. Moreover, much of the heat which is generated is carried away in the coolant which is circulated through the annular coolant channels 44 extending around the cup 22. As a result, the bearing 2 tends to operate near room temperature, and there is not a significant rise in temperature during initial or subsequent periods of operation. This makes the bearing 2 ideally suited for use in precision machinery and particularly suitable for the spindles of precision machine tools.

Stated differently, in the bearing 2 or for that matter any other rolling element bearing a hydrodynamic oil film is created by the surface motion of the rolling elements. When this hydrodynamic film is compressed between the rolling elements and another surface, namely the bearing raceways, an elastohydrodynamic oil film developes. The creation of the elastohydrodynamic oil film requires work or energy, and the energy so provided appears as heat within the oil film, causing the temperature of the oil film and bearing to rise.

In the bearing 2 the depth of the grooves 36 and 42 is greater than the thickness of the elastohdrodynamic oil film, and consequently no elastohydrodynamic film develops along the grooves 36 and 42. Indeed, the elastohydrodynamic oil film is confined only to the relatively narrow raceway segments or bands located to the sides of the grooves 36 and 42. As a result the heat generated in producing the elastohydrodynamic oil film in the bearing 2 is significantly less than the heat generated in bearings of equivalent size having full line contact between their rollers and raceways.

Since the rollers 24 are relatively long, or at least as long as rollers in comparable tapered roller bearings of conventional design, the rollers 24 remain stabilized between the raceways 28 and 40 insofar as the orientation or axial disposition is concerned. In other words, the rollers 24 avoid skewing with respect to the raceways 28 and 40 by reason of their conventional length, and this reduces the introduction of inaccuracies in the bearing 2 and in the disposition of the shaft 4 as the shaft 4 rotates. Indeed, the rollers 24 possess considerably more stability then do short rollers of equivalent, yet full line, contact length.

Furthermore, the presence of the circumferential grooves 36 and 42 in the raceways 28 and 40 and the resulting spreading of the contact areas along the raceways 28 and 40 provides increased rigidity for supporting the shaft 4 when compared to conventional bearings having short rollers of equivalent, yet full line, contact length.

In machine tools the cutting characteristics of the tool are related to the stiffness and the damping characteristics of the bearings in which the tool's spindle turns. Moreover, with rolling element bearings in which machine tool spindles turn, heat generation is directly related to stiffness. Since stiffness and damping characteristics of such bearings are related to the roller-raceway contact length, by varying the contact length or more specifically the width of the raceway grooves 36 and 42 an optimum condition of bearing stiffness, damping and heat generation may be reached for the operating requirements of a particular machine tool.

While the foregoing discussion has been confined to single row tapered roller bearings to simplify the description, it may also be used with double row tapered roller bearings. Moreover, the cone 20 may encircle annular channels similar to the annular channels 44, in which case it will be cooled in a like manner.

This invention is intended to cover all changes and modifications of the example of the invention herein chosen for purposes of the disclosure which do not constitute departures from the spirit and scope of the invention.

What is claimed is:

1. A tapered roller bearing comprising a cone having an outwardly presented raceway, a cup surrounding the cone and having an inwardly presented raceway located opposite to the cone raceway, and rollers interposed between the cup and the cone and having frustoconical side faces engaged with the raceways of the cup and cone, each of the raceways being relieved to form a depression therein so as to avoid full line contact between the frustoconical side faces of the rollers and the relieved raceways.

2. A tapered roller bearing according to claim 1 wherein the depression in each raceway is located intermediate its sides and is narrower than the length of the rollers, whereby the rollers engage the raceways on both sides of the depressions therein.

3. A tapered roller bearing according to claim 2 wherein the depressions in the raceways are grooves extending around the raceways.

4. A tapered roller bearing according to claim 3 wherein the cup is provided with at least one channel in which a fluent cooling medium circulates.

5. A tapered roller bearing according to claim 4 wherein the channel is annular and opens radially outwardly from the cup.

6. A tapered roller bearing according to claim 5 wherein the cup is provided with a plurality of channels located in axially spaced relation to each other across the outwardly presented face of the cup.

7. A tapered roller bearing comprising: a cone having an outwardly presented raceway along which an oil film exists; a cup surrounding the cone and having an inwardly presented raceway along which an oil film also exists, the cup raceway being located opposite to the cone raceway; and tapered rollers interposed between the cup and the cone and having frustoconical side faces engaged with the raceways of the cup and cone whereby an elastohydrodynamic oil film is created as the rollers roll along the raceways; both raceways defining cones having their apexes along the axis for the bearing; at least one of the raceways being relieved to form a groove which extends circumferentially around that raceway so that full line contact between the frustoconical side faces of the rollers and the grooved raceway is avoided, the depth of the groove being greater than the thickness of the elastohydrodynamic oil film.

8. A tapered roller bearing comprising an inner race having an outwardly presented tapered raceway defining a cone, the apex of which lies along the axis of the bearing; an outer race surrounding the inner race and having an inwardly presented raceway located opposite to the raceway of the inner race and also defining a cone, the apex of which lies along the axis of the bearing; at least one of the races having an annular groove between the ends of its raceway for dividing that raceway into two annular segments; tapered rollers interposed between the two races and having frustoconical side faces engaged with the raceways, the rollers spanning the groove in said one race so as to engage the raceway segments on both sides of the groove, whereby full line contact between the frustoconical side faces of the rollers and said one race is avoided and when a lubricant exists within the bearing the elastohydrodynamic oil film resulting therefrom is reduced; and a cage for spacing adjacent rollers.

9. A tapered roller bearing according to claim 8 wherein the depth of the groove exceeds the thickness of the elastohydrodynamic oil film.

10. A method for reducing heat generated in the operation of a lubricated roller bearing having races with opposed raceways thereon and rollers between the races and engaged with the raceways, said method comprising: reducing the elastohydrodynamic oil film between the rollers and at least one of the races by providing said one race with an annular groove between the ends of its raceway so that the raceway is divided into spaced apart annular segments and full line contact does not exist between the sides of the rollers and the segmented raceway, whereby an elastohydrodynamic oil film does not develop along the groove as the one race rotates relative to the other race and the rollers roll along the raceways.

* * * * *